United States Patent [19]

Ruf et al.

[11] Patent Number: 4,526,245
[45] Date of Patent: Jul. 2, 1985

[54] FORCE BALANCING WEIGHING SYSTEM

[75] Inventors: Walter Ruf, Sandy; Robert G. Kelley, South Jordan, both of Utah

[73] Assignee: St. Regis Corporation, New York, N.Y.

[21] Appl. No.: 510,679

[22] Filed: Jul. 5, 1983

[51] Int. Cl.³ .................... G01G 19/00; G01G 21/24
[52] U.S. Cl. ................................... 177/160; 177/255; 177/DIG. 9
[58] Field of Search ................. 177/160, 255, DIG. 9

[56] References Cited

U.S. PATENT DOCUMENTS 3,366,190 1/1968 Lau ..................................... 177/160
3,869,007 3/1975 Haggstrom et al. ......... 177/DIG. 9

Primary Examiner—George H. Miller, Jr.
Attorney, Agent, or Firm—Fitzpatrick, Cella, Harper & Scinto

[57] ABSTRACT

A force balancing system includes a plurality of flexure elements disposed to define the corners of an imaginary parallelogram, and each being fixed at one end and connected to a movable load bearing device at the other end so that forces acting through any one flexure element are in exact balance when the system is in equilibrium. The system finds application in weighing systems wherein the object to be weighed constitutes the load.

7 Claims, 4 Drawing Figures

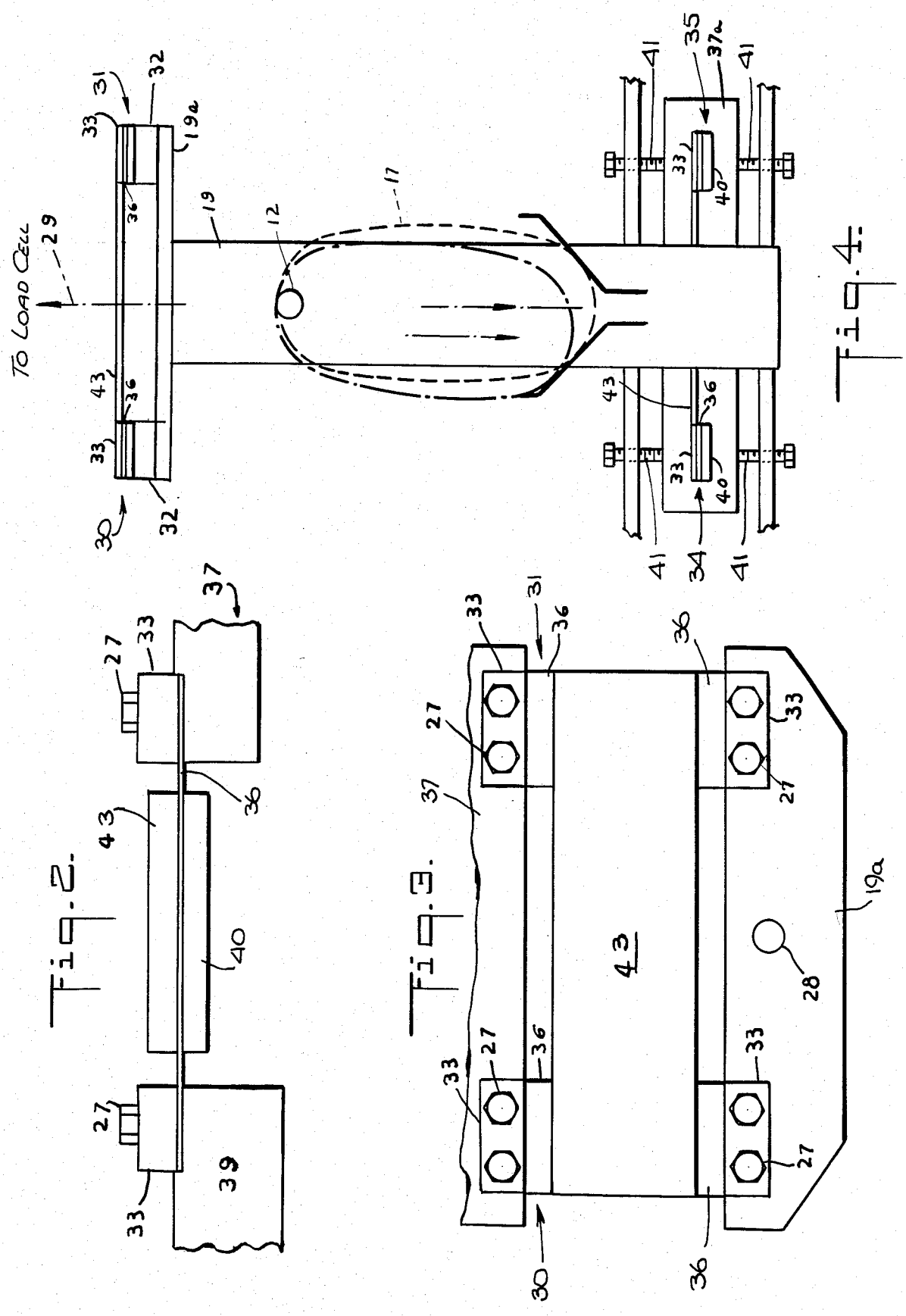

FORCE BALANCING WEIGHING SYSTEM

BACKGROUND OF THE INVENTION

1. Field of the Invention

This invention relates to force balancing weighing systems, and more particularly to such systems useful in machines for packaging fluidized dry, divided, solid material into containers such as paper bags, for example.

2. Description of the Prior Art

Packaging machines of the class described are well known to those skilled in the art, and are exemplified in U.S. Pat. No. 3,261,379 which discloses apparatus including a bin for fluidizing the material to be packaged and a tubular element or conduit for conducting such fluidized material to a filling spout which may constitute the discharge end of the conduit and upon which a bag may be secured to receive a charge of the material. The bag may be weighed and the flow of material cut-off when a predetermined weight is reached, cut-off being effected by pinching a flexible tube forming a portion of the conduit through which the fluidized material moves from the bin to the filling spout.

As further shown in U.S. Pat. No. 3,261,379, it is known in the art to mount the filling spout and a bag clamp on a bag support frame including a pair of legs suspended from a scale beam by knife edge fulcrums. The beam includes rearwardly extending members that are in turn supported on knife edge fulcrums mounted on a main frame which is separate from the frame mentioned above, and the rear portion of the beam supports a weight basket through knife edge fulcrums.

The bag support frame includes a bag seat for supporting bags to be filled and weighed and means are provided to discharge the bags from the seat.

While packaging apparatus of the class described that use weighing mechanisms of the scale beam type have achieved a degree of commercial success, nevertheless bag filling was not effected with the precision desired in the art due in part to imbalances in the knife edge fulcrums, but primarily due to the effect of incidental forces on the scale caused by random placement of the bag on the bag seat. Thus, for example, such incidental forces were often caused in the filling of a bag, which was laterally offset with respect to the vertical centerline of the weighing apparatus, these forces leading to cut-off of the flow of material at other than the desired filled bag weight.

Since commercialization of the structure disclosed in U.S. Pat. No. 3,261,379, the use of a load cell-microcomputer combination has been developed as part of the weighing system. Thus, a microcomputer responds to a load cell accurately to weigh, monitor, checkweigh and display bag weights. However, the full potential of these functions inherent in the load cell-computer conbination could not be realized with the conventional weighing system because of the incidental forces mentioned above.

SUMMARY OF THE INVENTION

We have conceived and contribute by the present invention a force balancing weighing system useful in packaging apparatus of the class described, for example, and by which we are able to overcome the foregoing difficulties and disadvantages and to achieve greater weight accuracy in filled bags.

In essence, our contribution resides in a force balancing system for use in apparatus which includes a weighing section for weighing an object. The system includes a first pair of flexure elements disposed in a horizontal plane adjacent the upper region of the weighing section, and a second pair of flexure elements disposed in a horizontal plane adjacent the lower region of the weighing section. Each flexure element is connected to the weighing section and to a fixed member whereby the flexure elements may flex or pivot under load to permit only vertical movement of the weighing section regardless of whether the forces applied to the weighing section during weighing of an object are offset relative to the vertical centerline of the weighing section.

Each pair of flexure elements may be formed of a pair of rigid, elastic members, such as flat plates of spring steel, fixed at one end against movement and to the weighing section at the other end, and a stiffener secured to both flexure elements of each pair. The stiffener may conveniently comprise a rigid bar overlying and secured to its respective flexure elements.

The position of at least two of the flexure elements may be vertically adjustable and load sensing means may be attached to the bag chair post, all as will later be described.

In a practical application, the system may be used in packaging apparatus of the type mentioned above wherein material to be packaged is caused to flow into a container and which apparatus includes a weighing section for weighing the container as it is filled so that the flow of material may be terminated when the container reaches a predetermined weight. In this case, the fixed member to which each flexure element is connected, may conveniently be the main frame of the packaging apparatus.

More specifically, we have constructed and successfully tested a commercially desireable packaging apparatus comprising a frame, a bin secured to the frame for containing material to be packaged and being provided with material discharge means including a dispensing outlet, conduit means defining a material flow path and a filling spout. The weighing section is constituted by means including a post for holding a bag in material receiving position relative to the discharge means and is disposed adjacent the frame. This weighing section is supported for vertical movement relative to the frame by the force balancing system described above. Thus, four flexure elements are connected to the frame and to the post, these flexure elements being disposed to define the corners of an imaginary parallelogram. Cut-off means are provided to operate when the weighing section records a predetermined bag weight, to close the discharge means.

We have found that such an arrangement effectively balances vertical unbalanced forces caused, for example, by laterally off-center loads relative to the vertical centerline of the bag holding means.

As will be understood by those skilled in the art, the flexure elements of each pair cannot readily be disposed precisely in the same horizontal plane due to practical tolerances of fabrication, wherefore, we also provide means, which may take the form of opposed jack screws, by which we are able vertically to adjust the position of the respective flexure elements of at least one of the pairs of flexure elements.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

DESCRIPTION OF THE DRAWINGS

Specific embodiments of the invention have been chosen for purposes of illustration and description, and are shown in the accompanying drawings, forming a part of the specification wherein:

FIG. 2 is an end view illustrating in detail means for supporting the bag weighing section relative to the machine frame;

FIG. 3 is a top plan view of the device illustrated in FIG. 2; and

FIG. 4 is a schematic elevational view of the force balancing system of the present invention illustrating its relationship to the weighing section post carrying a bag seat and filling spout.

Figure 1:
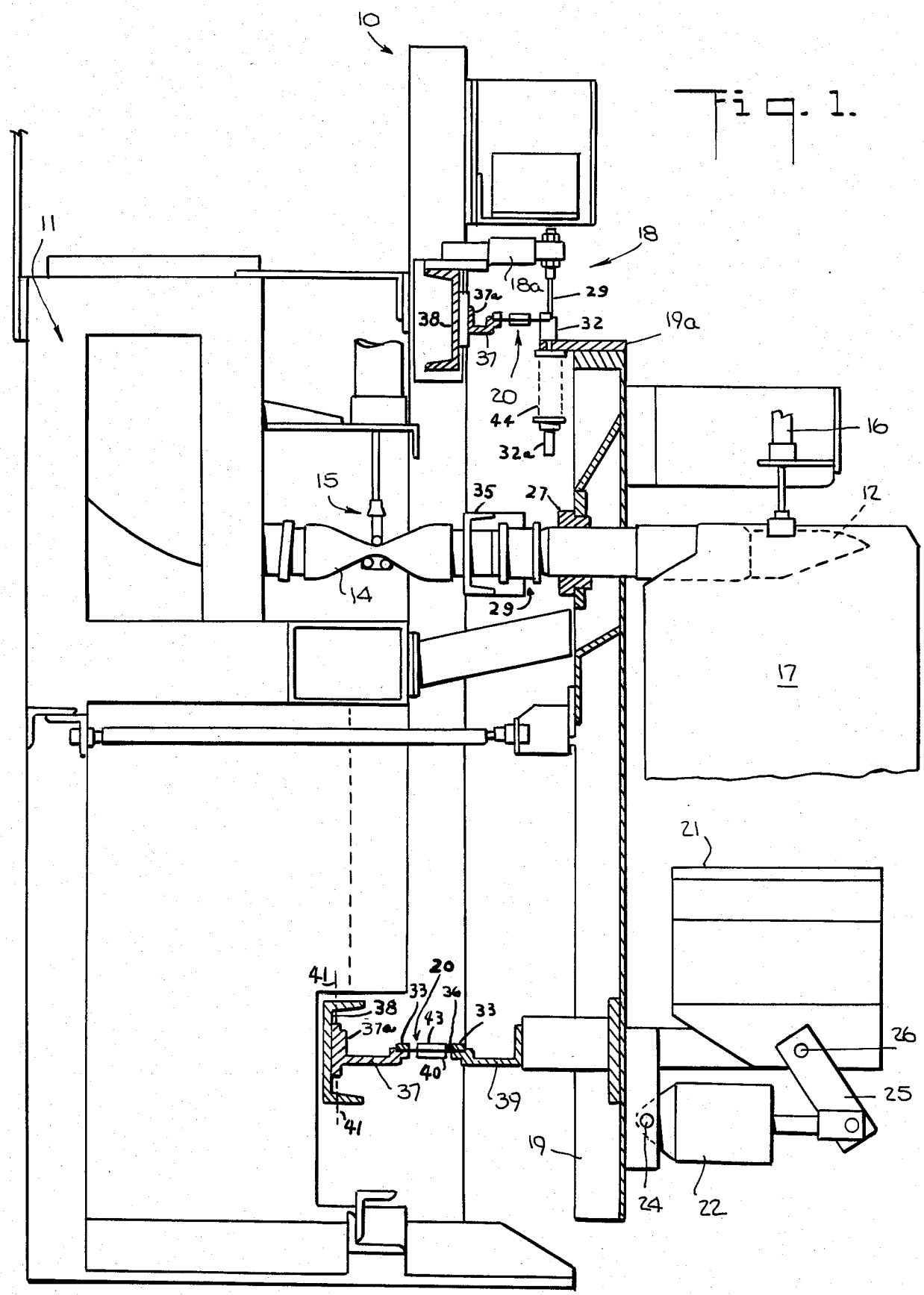
FIG. 1 is a schematic assembly view illustrating packaging apparatus in connection with which the present invention is employed.

For a detailed explanation of packing machines of the class described and in connection with which the present invention finds application, attention is again invited to U.S. Pat. No. 3,261,379.

Referring to FIG. 1 herein, there is shown a frame 10 which supports a material bin 11 similar to elements designated 11 or 41 in the above-mentioned patent, and having an outlet connected to a filling spout 12 by a flexible sleeve or pinch tube 14 which may be squeezed shut to stop the flow of material through the filling spout by a cut-off device 15 of known construction.

A pneumatically operable bag clamp assembly 16 of a known type is mounted above the filling spout 12 to engage a valve bag 17 in the region of its valve and clamp the same against the spout to maintain the bag valve around the spout so that material may flow through the spout into the bag to fill the same.

A bag chair post 19 is supported from the machine frame for controlled movement by a force balancing system designated 20. The chair post 19 supports a bag chair 21 for seating a bag during filling. Such seating arrangements are also well known in the art so that it is necessary here only to mention that the chair 21 may be tilted by operation of a pneumatic ram 22 pivoted as at 24 to the post 19 and the piston rod of which is pivoted to a crank arm 25 fixed to the bag seat at 26 thus to tilt the chair 21 to discharge a filled bag from the filling spout 12.

The filled condition of the bag is determined by its weight and, for this purpose, the chair post 19 is connected by a suitable bracket 19a to a load measuring device 18 which includes a load cell 18a conveniently mounted to the frame 10. A micro-computer, not shown, responds to the load cell and controls the pinch tube cut-off device 15 so that not only is the bag filled to a predetermined weight, but after cut-off, while the bag is still on the filling spout the micro-computer displays the filled bag weight, thus acting as a checkweigher.

As stated, the system of the present invention used to stabilize the bag post is arranged so that there are four points of pivot arranged to allow only vertical motion of the chair post 19.

Thus, as shown in FIGS. 1 to 4, the present force balancing system 20 includes four flexure elements 30, 31, 34 and 35 disposed to define the corners of a parallelogram, flexure elements 30 and 31 (FIG. 4) being disposed in a horizontal plane adjacent the upper end of the post 19 while flexure elements 34 and 35 are also disposed in a horizontal plane adjacent the lower end of the post 19.

As best shown in FIGS. 1 and 3, each flexure element comprises a rigid, flexible, flat plate 36 of high carbon steel having one end secured by a plate 33 and bolts 27 to a bracket 37 having a vertical portion 37a secured to a channel member 38 which is fixed to frame 10. The other end of plate 36 of each of the lower pair of flexure elements is fixed by a plate 33 and bolts 27 to a bracket 39 which is secured to post 19, while the corresponding end of plate 36 of each of the upper pair of flexure elements is fastened by a plate 33, metal block 32 and bolts 27 to bracket 19a. Bracket 19a is formed with an opening 28 halfway between blocks 32 through which a wire 29 passes, with wire 29 having its upper end connected to load cell 18a and its lower end connected to a threaded rod 32a. Rod 32a supports a spring 44 which bears against the lower surface of bracket 19a. Spring 44 is designed to compress only on bag overload to protect the load cell.

The plates 36 of each pair of flexure elements are joined to one another by a stiffener bar 43 that extends between the plates and overlies and is laminated to the central regions thereof, while a stiff metal block 40 underlies the central region of each plate and is also laminated to it.

Since the flexure elements define the four corners of a parallelogram and each pair is stiffened as described, the forces acting through any one flexure or pivot point are in exact balance when the system in in equilibrium. That is, the sum of the torque about any pivot point, the sum of horizontal components of forces acting at any pivot point, and the sum of the vertical components of forces at any pivot point are all equal to zero. Therefore, assuming that the system is calibrated to eliminate the influence of the weight of its moving parts on the load cell, the only vertical force acting on the system will be the weight of a bag and its contents, and the load cell will directly indicate this weight regardless of the placement of the bag on the filling spout 12 and bag chair 21.

In practice, we have realized excellent results by providing plates 36 of the order of about 2 inches in width, about 3 inches long and about 0.010 inches thick with stiffener bars about 1½ inches wide, 11 inches long and 3/16 inches thick, the blocks 40 being of like width and thickness.

As mentioned, the flexure elements of each pair cannot readily be disposed precisely in the same horizontal plane because of practical fabrication tolerances. Therefore, as shown in FIGS. 1 and 4, we have provided opposed jack screws 41 in the legs of channel member 38 by which we are able vertically to adjust the position of the respective flexure elements of the lower one pair of flexure elements, the jack screws acting on the vertical portion 37a of bracket 37 which is constructed and arranged to slide vertically along the interior surface of the web of channel 38.

While we have described our novel weighing system in connection with packaging apparatus to which it has practical application, such association is not intended to be limiting since it will be appreciated that the system itself may have applications in association with other apparatus.

We believe that the construction and application of our novel weighing system will now be understood and that the several advantages thereof will be fully appreciated by those persons skilled in the art.

We claim:

1. A force balancing system for use in apparatus which includes a weighing section for weighing an object, said system comprising:
   a first pair of horizontally spaced flexure elements disposed in a horizontal plane adjacent the upper region of the weighing section;
   a second pair of horizontally spaced flexure elements disposed in a plane adjacent the lower region of the weighing section and parallel to said first plane;
   a stiffener member extending between and secured to both flexure elements of each pair; and
   means connecting each flexure element to said weighing section and to a fixed member whereby said flexure elements may flex under load to permit only vertical movement of said weighing section regardless of whether the forces applied to said weighing section during weighing of the object are offset relative to the vertical centerline of the weighing section.

2. A system according to claim 1, wherein each pair of flexure elements comprise a plurality of rigid, elastic members fixed at one end against movement and to the weighing section at the other end.

3. A system according to claim 1, wherein said stiffener means comprises a rigid bar overlying both flexure elements of each pair.

4. A system according to either of claims 1 to 3 wherein the position of at least two of said flexure elements is vertically adjustable.

5. Packaging apparatus comprising in combination:
   a frame;
   a bin secured to said frame for containing material to be packaged and being provided with material discharge means including a dispensing outlet, conduit means defining a material flow path and a filling spout;
   weighing means, including a post, for holding a bag in material receiving position relative to said discharge means;
   cut-off means operative when said weighing means records a predetermined bag weight to close said discharge means;
   means including four flexure elements each connected to said frame and to said post to support said post for vertical movement relative to said frame and disposed to define the corners of an imaginary parallelogram; and
   a stiffener member extending between and secured to each flexure element of the upper and lower pairs of flexure elements, respectively;
   whereby unbalanced vertical forces relative to the vertical centerline of said bag holding means are balanced along said centerline.

6. Packaging apparatus according to claim 5, wherein said flexure elements include a first pair of said flexure elements disposed in a horizontal plane adjacent the upper end of said post a second pair of said flexure elements disposed in a horizontal plane adjacent the lower end of said post and load sensing means are responsive to movement of said weighing means.

7. Packaging apparatus according to claim 6, wherein said flexure elements are each formed of rigid, elastic plates.

* * * * *